US006970350B2

(12) United States Patent
Schmid et al.

(10) Patent No.: US 6,970,350 B2
(45) Date of Patent: Nov. 29, 2005

(54) COMPUTER ALLOWING EASY INSERTION OF PC COMPONENTS

(75) Inventors: Michael Schmid, Dillingen (DE); August Scherer, Dinkelscherben (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 10/730,620

(22) Filed: Dec. 8, 2003

(65) Prior Publication Data

US 2004/0228079 A1   Nov. 18, 2004

Related U.S. Application Data

(63) Continuation of application No. PCT/DE02/01965, filed on May 28, 2002.

(30) Foreign Application Priority Data

Jun. 6, 2001 (DE) ................................ 101 27 335

(51) Int. Cl.[7] ............................................. G06F 1/16
(52) U.S. Cl. .................. 361/683; 361/685; 211/41.17; 292/128; 312/223.1

(58) Field of Search ...................... 361/679, 683–686, 361/724–727; 312/223.1, 223.2, 265.6, 265.5, 312/263, 293.3, 257.1; 211/41.17; 292/128, 292/228, 103, 204

(56) References Cited

U.S. PATENT DOCUMENTS

| | | | | |
|---|---|---|---|---|
| 5,067,041 A | * | 11/1991 | Cooke et al. | ................ 361/685 |
| 5,112,119 A | | 5/1992 | Cooke et al. | |
| 5,986,881 A | * | 11/1999 | Yang | ........................... 361/685 |
| 6,245,430 B1 | | 6/2001 | Hourai et al. | |
| 6,278,606 B1 | * | 8/2001 | Schmitt et al. | ............. 361/683 |
| 6,711,008 B2 | * | 3/2004 | Teng et al. | ................. 361/683 |
| 2004/0120107 A1 | * | 6/2004 | Davis et al. | ................ 361/683 |

* cited by examiner

Primary Examiner—Lisa Lea-Edmonds
(74) Attorney, Agent, or Firm—Laurence A. Greenberg; Werner H. Stemer; Ralph E. Locher

(57) ABSTRACT

A computer has a case with a front side that is clad with a front panel. The front panel includes openings beside the mounting spaces for receiving PC components with attached retaining bars. The PC components can be inserted into the computer by way of the front side without having to disassemble the front panel.

6 Claims, 3 Drawing Sheets

COMPUTER ALLOWING EASY INSERTION OF PC COMPONENTS

CROSS-REFERENCE TO RELATED APPLICATION

This application is a continuation of copending International Application No. PCT/DE02/01965, filed May 28, 2002, which designated the United States and was not published in English.

BACKGROUND OF THE INVENTION

FIELD OF THE INVENTION

The invention relates to computer with a case having a front side that is clad with a front panel, in which PC components can be inserted into the computer by way of the front side and can be fixed at a cage in the computer. The fixing is accomplished using retaining bars that can be attached to the sides of the PC components.

The fixing of PC components or disk drives by using laterally attachable retaining bars is known, for instance, from Published German Patent Application DE 299 14 768 U1.

The advantage of this type of fastening compared to screwing the components to the cage is that the mounting can be performed substantially more quickly, and screws cannot drop into the interior of the computer where they may cause shorts.

Another advantage is the reduction of the transmission of structure-borne noise compared to screw fastening.

The standard PC components, namely disk drives, are provided with a panel, and the attachable retaining bars protrude laterally beyond this panel and are received in corresponding openings in the cage during the assembly of the PC components.

In order to achieve an aesthetic look, the retaining bars should not be visible from the outside, and after the assembly, the gap between the front panels of the PC components and the front panel of the computer should be narrow and uniform.

Therefore, the front panel must always be disassembled before mounting a disk drive with retaining bars and must be reassembled after mounting the PC components.

SUMMARY OF THE INVENTION

It is accordingly an object of the invention to provide a computer which overcomes the above-mentioned disadvantages of the prior art apparatus of this general type.

In particular, it is an object of the invention to develop the fastening of PC components, so as to eliminate the front panel disassembly.

This object is inventively achieved by providing the front panel with openings next to the PC components that are being received, so that the PC components with attached retaining bars can be inserted into the computer through the front panel.

With the foregoing and other objects in view there is provided, in accordance with the invention, a computer including a plurality of PC components. Each one of the plurality of PC components is attached to a plurality of retaining bars. The computer has a case including a front side clad with a front panel. The front panel is formed with a plurality of openings. Each one of the plurality of openings is for receiving a respective one of the plurality of PC components attached to the plurality of retaining bars. The computer also has cage for fixing the plurality of PC components.

By providing openings in the front panel, the disassembly of the front panel can be avoided both during the insertion and during the removal of the PC components.

In order to achieve an aesthetic look, the ends of the retaining bars, which point toward the front side of the computer with the PC component mounted, are provided with a cover that occludes the opening in the front panel given a mounted PC component. The cover is advantageously dimensioned to form a flush surface with the surface of the front panel given a mounted PC component.

According to a preferred embodiment, the cover includes fixing tabs that protrude in the direction of the front panel and that extend into corresponding openings in the front panel during the assembly of the PC components.

The fastening tabs serve for fastening the cover, and the retaining bars on the front panel bring the added advantage that the disk drive is exactly aligned in the front panel, and uniform distances from the front panel and the adjoining disk drives emerge on the sides of, above, and below the disk drive panel. This is very important for a high-quality, appealing look, because wedge-shaped gaps are considered by merchants to be unappealing and unprofessional and impart a bad image to the computer as a whole.

This problem of wedge-shaped gaps occurs particularly with heavy components and trough type cases.

Given a case with a trough shape, the interior is accessible only from the front of a wide side. The screwing of the PC components to the cage thus usually occurred only from the accessible wide side, so that the PC components always hung down slightly on the free side, as a result of which a wedge-shaped gap emerged relative to the front panel and the adjoining lighter disk drives.

Other features which are considered as characteristic for the invention are set forth in the appended claims.

Although the invention is illustrated and described herein as embodied in a computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
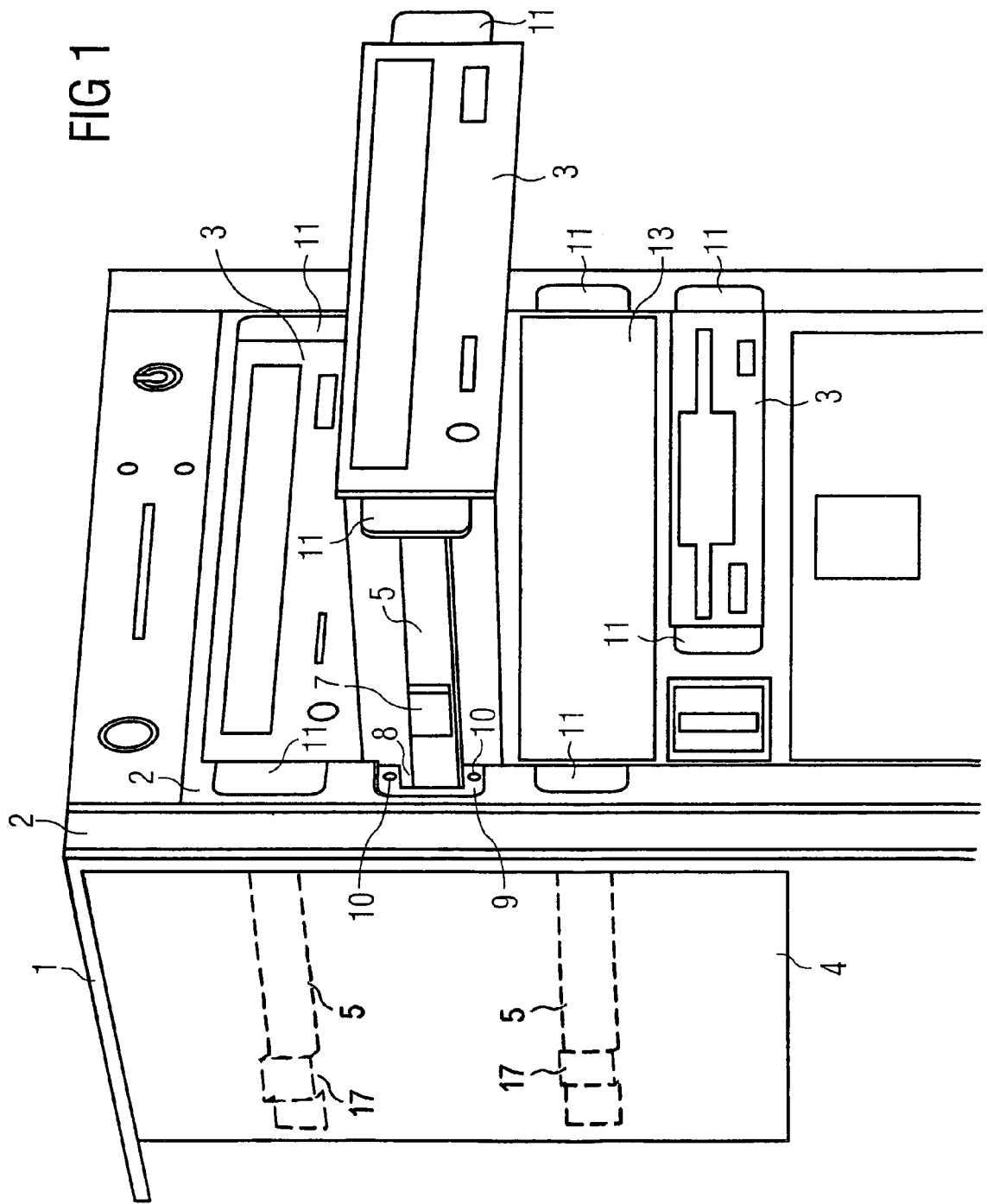
FIG. 1 is an oblique view of a computer with an open wide side and a half-mounted disk drive.

Referring now to the figures of the drawing in detail and first, particularly, to FIG. 1 thereof, there is shown a computer with a case 1 in tower form. The front side of the case 1 is clad with a front panel. In the represented exemplary embodiment, two CD-ROM drives and one 3½" disk drive are shown as PC components 3 that are inserted into the computer by way of the front side.

The middle CD-ROM drive is represented in the half-mounted state.

Figure 2:
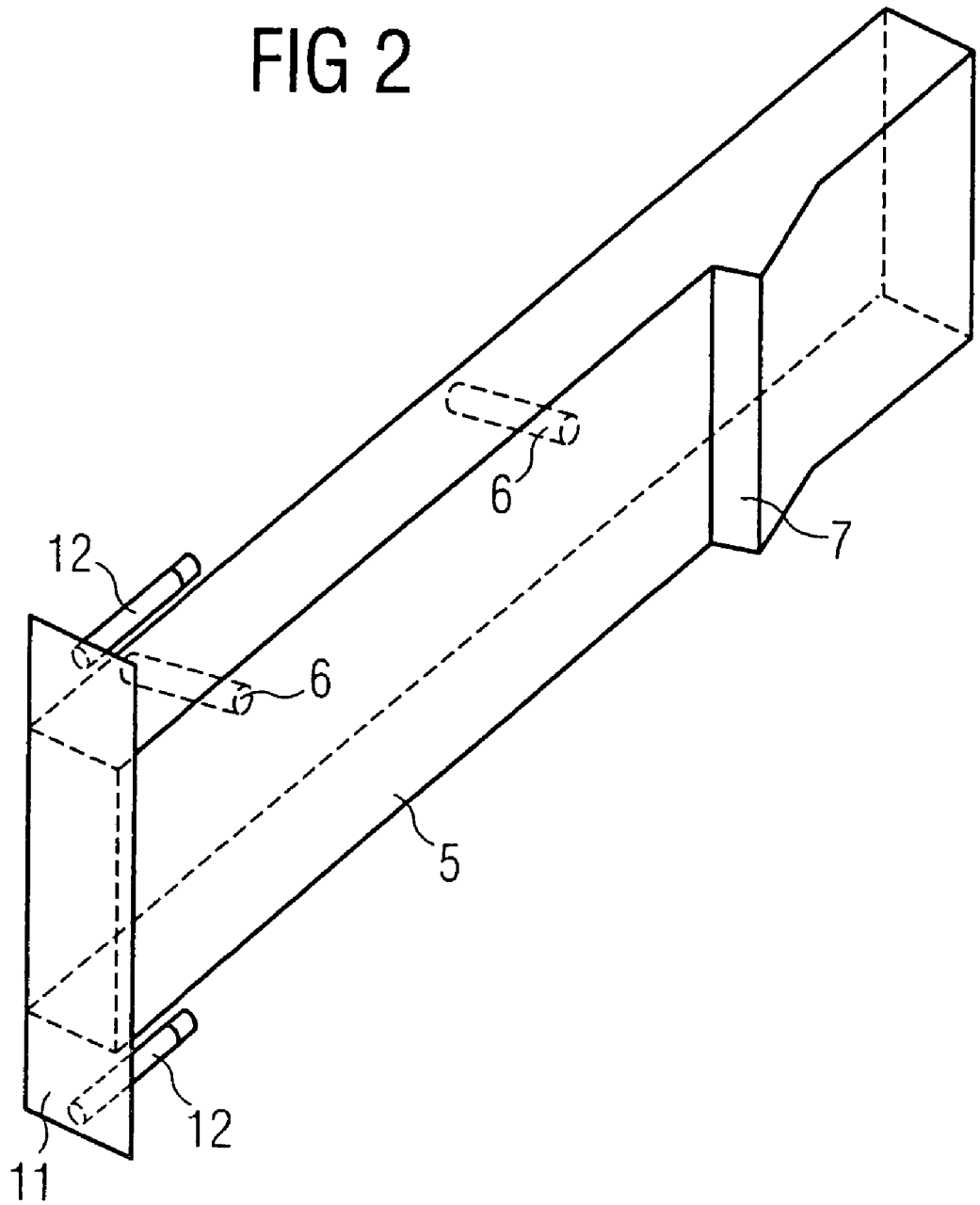
FIG. 2 is an oblique view of a retaining bar.

Like most PCs, the computer includes a cage 4 at which the PC components 3 are fastened. Lateral retaining bars 5 are attached to the PC components 3 for fastening. The retaining bars 5 include tabs 6 that project toward the disk drive as represented in FIG. 2. The tabs 6 engage in the standard threaded boreholes on the side of the standard disk drives, i.e. PC components 3.

The retaining bars 5 are inserted in the cage 4 into corresponding openings.

For fastening inside the cage, the retaining bars 5 include an outwardly projecting latch hook 7 (see FIG. 2), which interacts with a corresponding counter-latch 17 in the cage 4.

In order to avoid disassembling the front panel 2 for the purpose of assembling the PC components 3, the panel inventively includes openings 8 next to the PC components 3 that are received, so that the PC components 3 can be inserted into the cage 4 through the front panel 2 with the retaining bars 5 attached as represented in FIG. 1.

The opening 8 is surrounded by a depressed region 9 that is slightly depressed relative to the surface of the front panel. Two openings 10 are provided above and below the opening 8.

As represented in FIG. 2, the end of the retaining bar 5 that points toward the front side of the computer with the PC components mounted is provided with a lid 11 which covers the opening 8 and the depressed region 9 when PC components 3 are in the mounted condition.

Attached to the lid 11 are two inwardly projecting fixing tabs 12, which are inserted into the openings 10 during the assembly of the PC component 3.

The fixing tabs 12 thus provide for fastening the lid, and thus the retaining bars 5, at the front panel 2. The fixing tabs 12 also ensure that the PC component 3 is exactly aligned relative to the front panel 2, so that uniform gaps emerge beside the PC component 3 and above and below it in the direction of the adjoining PC components.

The fixing tabs 12 have the additional advantage that the retaining bars 5 can be slid in at the mounting locations in the computer at which PC components have not yet been received, and can be fastened by the fixing tabs 12 at the front panel 2.

This is represented in the mounting location between the bottom CD-ROM drive and the 3½" disk drive, where the front side is sealed by a disk drive blind panel 13.

The advantage of this is that a customer who has purchased a standard disk drive only has to remove the blind panel 13, and the two retaining bars 5 can be removed from the free mounting space. She must then fasten these to her standard disk drive, which she can subsequently insert into the free mounting space again.

Figure 3:
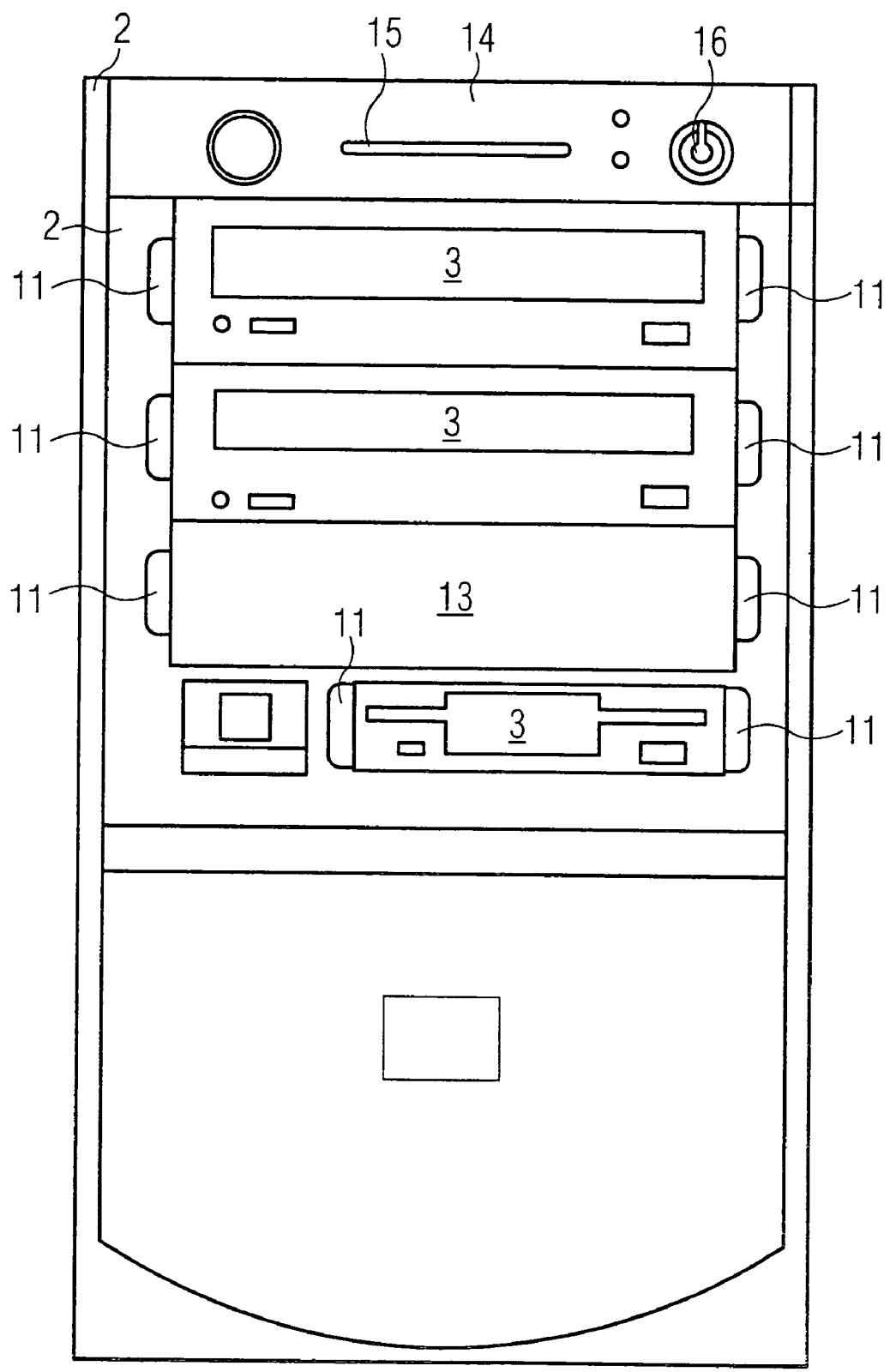
FIG. 3 is an elevational view of the front side of the inventive computer.

FIG. 3 is a front view of the computer shown in FIG. 1. A case 14 for an ID card reader, a card slot 15 and a lock 16 for locking the computer is integrated into the top side of the front panel in the represented embodiment.

We claim:

1. A computer, comprising:
   a plurality of PC components, each one of said plurality of PC components attached to a plurality of retaining bars;
   a case including a front side clad with a front panel, said front panel formed with a plurality of openings, each one of said plurality of openings for receiving a respective one of said plurality of PC components attached to said plurality of retaining bars; and
   a cage for fixing said plurality of PC components.

2. The computer according to claim 1, wherein:
   each one of said plurality of retaining bars has an end pointing toward said front side of said case; and
   said end of each one of said plurality of retaining bars has a lid for covering one of said plurality of openings in said front panel.

3. The computer according to claim 2, wherein:
   said front panel is formed with a second plurality of openings;
   said lid includes a plurality of fixing tabs projecting towards said front panel; and
   said plurality of fixing tabs are configured for being inserted into said second plurality of openings in said front panel when said plurality of PC components are being mounted.

4. The computer according to claim 3, wherein:
   said plurality of PC components are formed with a plurality of lateral standard threaded boreholes;
   said plurality of retaining bars include a plurality of tabs projecting towards said plurality of PC components; and
   each one of said plurality of tabs is pushed into a respective one of said plurality of lateral standard threaded boreholes when said plurality of PC components are being mounted.

5. The computer according to claim 1, wherein:
   said cage includes a plurality of counterlatches; and
   each one of said plurality of retaining bars includes a latch hook for interacting with a corresponding one of said plurality of counterlatches of said cage when said plurality of PC components are being mounted.

6. The computer according to claim 1, wherein:
   said case has a broad side;
   said case is formed with an interior; and
   said interior of said case is accessible only from said front side and said broad side of said case.

* * * * *